July 2, 1946. V. J. PLOTKIN 2,403,102

MULTIPLE ACCESSORY OPERATING MECHANISM

Filed Feb. 14, 1945 4 Sheets-Sheet 1

INVENTOR.
VICTOR J. PLOTKIN
BY
Richard A. Marsen
ATTORNEY

July 2, 1946.　　　V. J. PLOTKIN　　　2,403,102
MULTIPLE ACCESSORY OPERATING MECHANISM
Filed Feb. 14, 1945　　　4 Sheets-Sheet 4

INVENTOR.
VICTOR J. PLOTKIN
BY
Richard A. Marsh
ATTORNEY

Patented July 2, 1946

2,403,102

UNITED STATES PATENT OFFICE 2,403,102

MULTIPLE ACCESSORY OPERATING MECHANISM

Victor J. Plotkin, Los Angeles, Calif., assignor, by mesne assignments, to Lear, Incorporated, Grand Rapids, Mich., a corporation of Illinois Application February 14, 1945, Serial No. 577,901

20 Claims. (Cl. 244—102)

This invention relates to multiple accessory operating mechanisms, and more particularly to mechanism for automatically opening and closing aircraft landing gear bay doors and lowering and raising landing gear in correct sequence.

In accordance with the present invention, a multiple accessory mechanism is provided comprising a driving means connected to a planetary gearing including a driving element coupled to the driving means, a first driven element coupled to one accessory and a second driven element coupled to another accessory. The arrangement is such that either one of the driven elements will be operated by the driving element depending upon which has the least torque resistance to operation. As applied to the operation of landing gear of aircraft, one of the planetary driven elements is connected through mechanical actuators to operate the doors enclosing the landing gear bay or recess and the other driven element is connected through mechanical actuators to operate the landing gear. Under normal conditions, the mechanism is so designed that the initial torque resistance of the landing gear is greater than that of the doors. Accordingly, when the driving means starts to operate, there will be less torque resistance from the actuators for the doors and the doors will be opened. At their limit of movement, the doors will offer a greatly increased torque resistance and the mechanism will then operate to lower or raise the landing gear. When this latter reaches its limit of movement in either direction, the torque resistance developed thereby conditions the mechanism to raise the doors to their closed position.

It is among the objects of this invention to proved a novel multiple accessory operating mechanism automatically operative to perform one or more operations in a predetermined sequence; to provide a multiple accessory operating mechanism including planetary gearing having elements connected to operate each of a pair of accessories; to provide a multiple accessory operating mechanism including torque means for effecting predetermined sequential actuation of two accessories; to provide a novel aircraft landing gear door and landing gear operating mechanism effective to operate the doors and the landing gear in a predetermined sequence; and to provide a simple, reliable, automatic actuator for raising and lowering aircraft landing gears and operating the covers or doors for the landing gear bay or recess.

These and other objects, advantages and novel features of the invention will be apparent from the following description and accompanying drawings. In the drawings.

Figure 1:
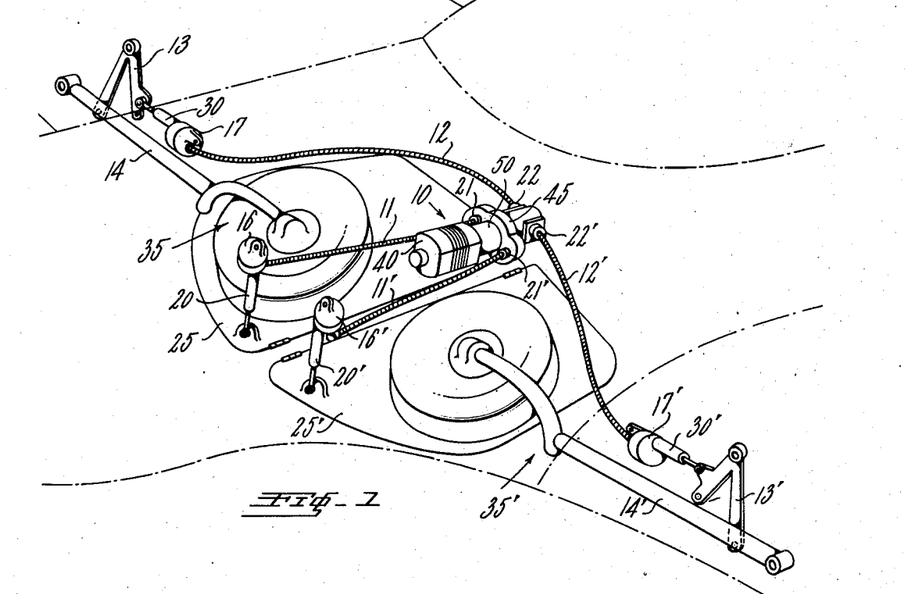
Fig. 1 is a diagrammatic perspective view illustrating the invention as incorporated in an aircraft.

Referring to the drawings, the multiple accessory operating mechanism 10 of the invention is illustrated as arranged to operate the landing gear and landing gear bay doors of an aircraft 15, the forward portion of which is illustrated in dotted outline. For this purpose, operating elements of mechanism 10 are connected by flexible shaftings 11, 11' to actuators 20, 20' coupled to operate doors 25, 25' for the landing gear bay of aircraft 15. Other operating elements of mechanism 10 are connected by flexible shaftings 12, 12' to actuators 30, 30' which are coupled through linkage, indicated generally at 13, 13', to struts 14, 14' of landing gear 35, 35'.

Suitable electric control circuits are connected to control an electric motor forming part of mechanism 10. As will be described, when the control circuit is conditioned to effect lowering of the landing gear, mechanism 10 will first operate to lower doors 25, 25' through actuators 20, 20' and, when the doors have reached the limit of their opening movement, will lower landing gear 35, 35' through actuators 30, 30'. When the landing gear has reached its lower limit of movement, mechanism 10 will automatically be conditioned to close doors 25, 25' through operation of actuators 20, 20'. Similarly, when it is desired to raise the landing gear, mechanism 10 will first open doors 25, 25' and then raise landing gear 35, 35' to its upper position, wherein it is latched by suitable means well known to those skilled in the art, and mechanism 10 will then close doors 25, 25'. Each of such sequences of operation takes place automatically upon the closing of a suitable switch in the control circuit to either the "landing gear up" or "landing gear down" position. In both sequences of operations, when the landing gear has either been fully opened or fully raised, the doors 25, 25' have again been closed, the electric motor for mechanism 10 is automatically deenergized, through opening of its energizing circuit.

More specifically, driving elements of mechanism 10 are connected through cables 11, 11' to gear boxes 16, 16' which may be hingedly connected to a suitable fixed portion of aircraft 15. Actuators 20, 20' either may be jack screws of the type described and claimed in William P. Lear's Patent No. 2,319,463 issued May 18, 1943, for "Mechanical actuator systems," or may be suitable reduction gearing units operable by the gearing in gear housings 16, 16'. Similarly, flexible cables 12, 12' connect other driving elements of mechanism 10 to gear housings 17, 17' connected to actuators 30, 30'. Actuators 30, 30' may likewise be of the type described and claimed in said Lear patent, or may be suitable reduction gearing units. Gear housings 17, 17' may be pivotally connected to a fixed portion of aircraft 15, as may also be linkages 13, 13'. The illustrated arrangements for operating the landing gear and doors are exemplary only, and the invention resides in the mechanism 10 which is not limited to operating the doors and landing gear through any particular type of drive means.

Mechanism 10 is more clearly illustrated in Figs. 2 through 8. It comprises a reversible electric motor 40 driving a planetary gearing unit 45 through the medium of a torque responsive device 50. Planetary gearing unit 45, as will be described more fully hereinafter, includes a driving member coupled, through torque responsive device 50, to motor 40. It also includes a first driven element coupled to flexible shaftings 11, 11' through coupling elements secured to threaded bosses 21, 21'. A second driven element of the planetary gearing is coupled to flexible shaftings 12 or 12' through coupling elements secured to threaded bosses 22, 22'.

Figure 2:
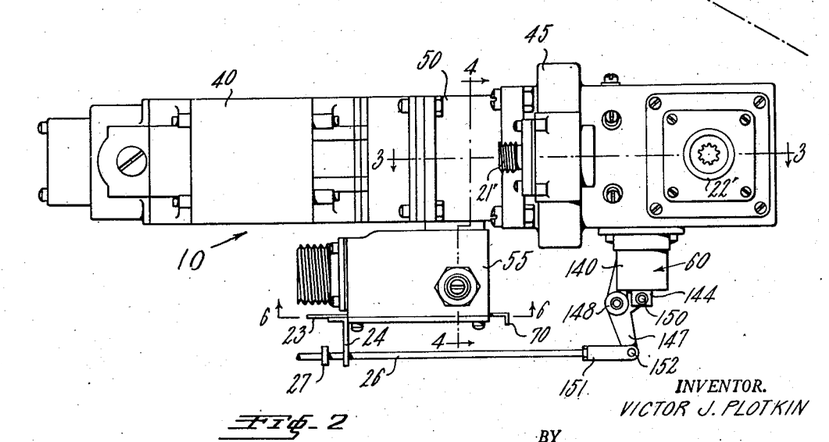
Fig. 2 is a side elevational view of a multiple accessory operating mechanism.
Figure 3:
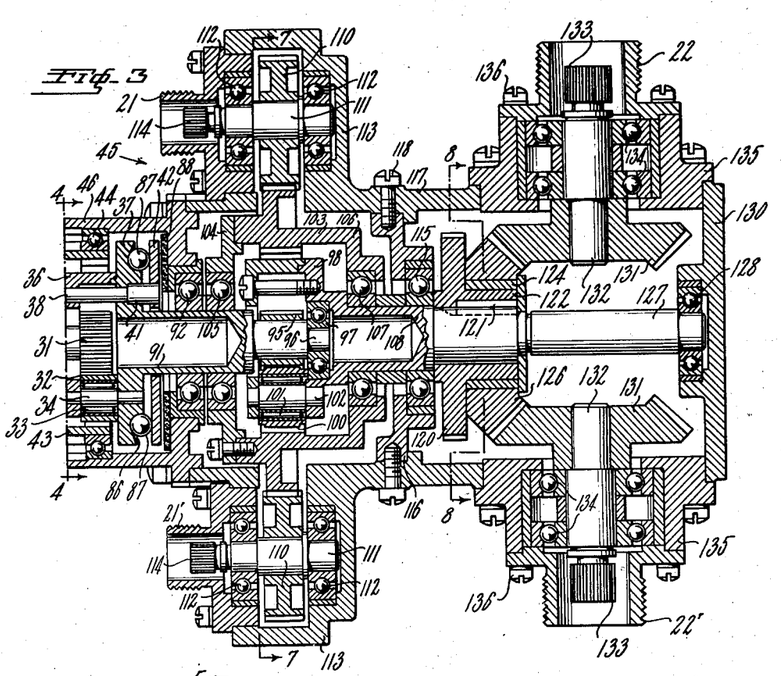
Fig. 3 is a longitudinal sectional view, on the line 3—3 of Fig. 2 through a portion of the mechanism shown in Fig. 2.
Figures 4, 7:
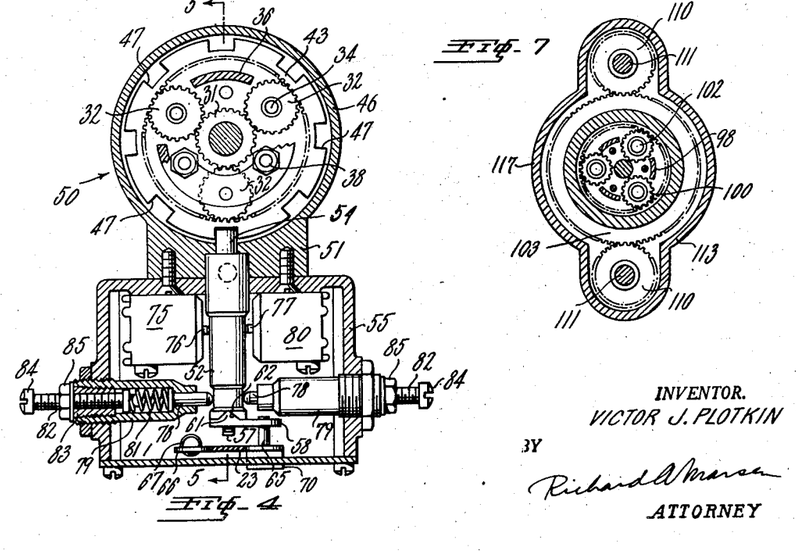
Fig. 4 is a transverse sectional view on the line 4—4 of Fig. 2.
Fig. 7 is a reduced cross-sectional view, looking in the direction of the arrows, on the line 7—7 of Fig. 3.
Figure 5:
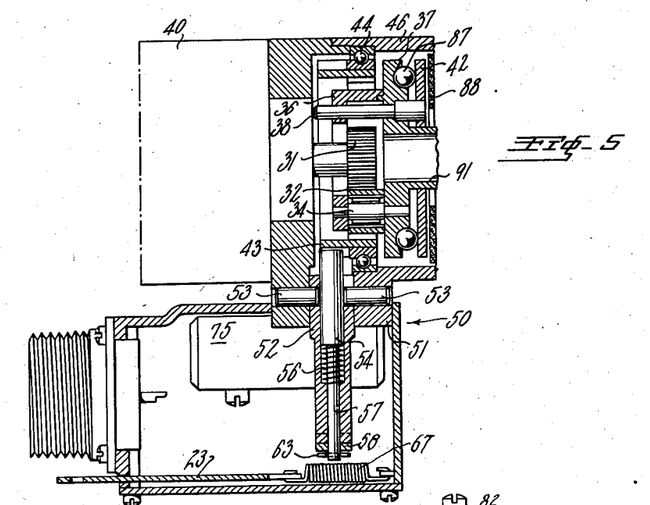
Fig. 5 is a sectional view, looking in the direction of the arrows, on the line 5—5 of Fig. 4.
Figure 6:
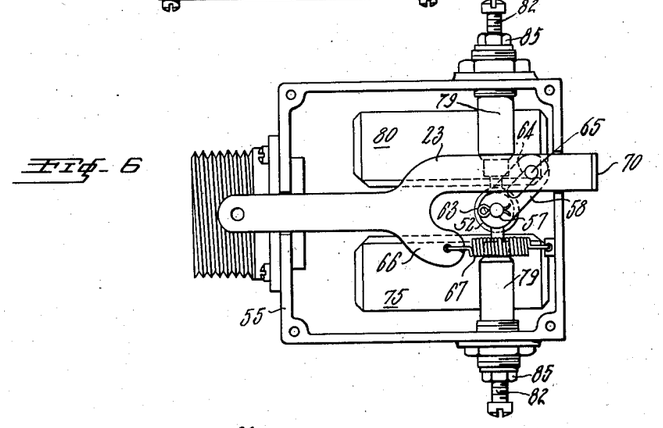
Fig. 6 is a bottom plan view, with the cover removed, on the line 6—6 of Fig. 2.

Torque responsive device 50 is adapted to operate switch means contained in a control box 55. As will be explained, torque responsive device 50 may be manually operated to operatively uncouple motor 40 from planetary gearing 45 through the medium of a cable connected to a bar 23 slidably mounted in control box 55. Bar 23 is provided with a depending flange or ear 24 slidably engaging a rod 26 coupled to a brake release mechanism 60. Rod 26 is provided with a collar 27 whereby, when bar 23 is pulled to the left, as shown in Fig. 2, flanges 24 will engage collar 27 and move rod 26 to the left.

Brake means 60 normally locks the aforementioned second driven element of planetary gearing 45 against rotation. Rod 26 is connected to doors 25, 25' and when these doors reach their fully open position, rod 26 is moved to the left, as viewed in Fig. 2, to release brake means 60 from the second driven element of planetary gearing 45.

Due to the described arrangement, motor 40 will first operate doors 25, 25' to the open position through the first driven element of planetary gearing 45. When the doors are fully opened, brake means 60 is released. Motor 40 thereupon operates landing gear 35, 35' to either the extended or retracted position through the second driven element of planetary gearing 45. When the landing gear has reached its extent of movement in either direction, torque responsive device 50 operates the switch means in control box 55 to effect circuit connections for motor 40 in a direction to close doors 25'. When doors 25' reach the closed position, torque responsive device 50 operates switch means in control box 55 to deenergize the motor.

Referring more particularly to Figs. 3 through 6, motor 40 is provided with a drive pinion 31 engaging a plurality of pinions 32 each rotatably mounted through bearings 33 on shafts 34 mounted in disks 36 and 37. Disks 36 and 37 are interconnected by studs 38 provided with extensions 41 slidably supporting a braking disk 42 for axial movement with respect to disk 37. The purpose of this arrangement will be described hereinafter. Pinions 32 mesh with a ring gear 43 rotatably mounted on bearings 44 in housing 46 of torque responsive device 50. The outer periphery of ring gear 43 is provided with circumferentially spaced notches 47.

Control box 55 is secured to a boss 51 on housing 46. A sleeve member 52 is pivotally mounted on pins 53, 53 disposed in boss 51 and a plunger 54 is slidably mounted in sleeve member 52. The upper end of plunger 54 normally is urged into engagement with one of the notches 47 by a spring 56 surrounding a reduced portion of the plunger and engaged between a shoulder in sleeve member 52 and a shoulder of plunger 54. The lower end 57 of plunger 54 extends outwardly through sleeve member 52 and acts as a pivotal support for a cam 58. Cam 58 is provided with a triangular shoulder 61 normally engaging a triangular notch 62 in the lower end of sleeve member 52. A pin 63 extends through the lower end of portion 57 of plunger 54.

Cam 58 is formed with an elongated slot 64 slidably receiving a pin 65 on bar 23. Bar 23 is provided with an offset ear 66 engaged by a coil spring 67 connected to one wall of control box 55. Spring 67 normally urges bar 23 to the right as viewed in Figs. 2 and 6. Leftward movement of bar 23 is limited by a down turned flange 70 on the outer end of the bar. When bar 23 is moved to the left as viewed in Fig. 2, cam 58 is rotated so that its shoulder 61 is moved out of notch 62. The cam is thereby moved downwardly and through engagement with pin 63 moves plunger 54 downwardly against the force of spring 56. This releases the upper end of the plunger from engagement with ring gear 43, permitting this ring gear to rotate. The purpose of this arrangement will be described hereinafter.

A pair of snap action control switches 75 and 80 are mounted in control box 55. The plungers 76 and 77 of these switches are engaged by sleeve member 52. Sleeve member 52 is normally biased to a vertical position by adjustable means secured to control box 55. This means comprises a pair of plungers 78, 78 mounted in tubular housings 79 secured to the control box. Plungers 78 are normally urged outwardly by springs 81 engaging the inner ends of the plunger and adjustable member 82 threadedly engaged in a nipple 83 threaded into housing 79. Adjustable rods 82 are provided with a head 84 for engagement with a screw driver or other means to adjust the pressure of springs 81 against plungers 78, and the adjustment may be fixed by lock nut 85 engaging members 82. By suitable adjustment of members 82, the pressure of plungers 78 biasing sleeve member 52 to the vertical position may be preset at any desired value.

The arrangement thus far described operates as follows. When motor 40 is energized, its pinion 31 rotates pinions 32 which roll around the internal periphery of ring gear 43. As will be described hereinafter, pinions 32 are connected to the driving element of planetary gearing 45. When the torque upon such driving element exceeds a predetermined value, as adjusted by members 82, ring gear 43 will tend to oscillate in one direction or the other. In so moving, it will swing sleeve member 52 to depress one or the other of plungers 76 or 77 of switches 75 or 80, respectively. In a manner to be described more fully hereinafter, operation of switches 75, 80 alters the energization of motor 40 to accomplish automatic sequential operation mechanism 10.

Disks 37 and 42 form part of a centrifugal governor for limiting the rate of operation of the landing gears and doors. For this purpose, disk 37 is provided with radially outwardly tapered surface slots 86 in which are mounted centrifugal means such as balls 87. When the speed of rotation of disks 37 and 42 exceeds a preselected value, balls 87 move radially outwardly in slots 86 to mechanically bias disk 42 against a braking surface 88 secured to a wall of housing 46. This effects a braking action on torque device 50 and consequently upon the elements of mechanism 10 connected thereto.

Disk 37 is formed integrally with a shaft 91 mounted in a bearing 92 in the housing of planetary gearing 45. Driving pinion 95 of planetary gearing 45 is mounted on the outer end of shaft 91, which has a reduced portion 96. A bearing 97 on reduced portion 96 rotatably supports a spider 98 of planetary gearing 45. Spider 98 supports a plurality of planetary pinions 100 rotatably mounted, through bearings 101 on shafts 102 supported in the spider. Pinions 101 engage an internal ring gear 103 forming the above mentioned first driven element of the planetary gearing. Ring gear 103 includes a disk 104 rotatably supported through a bearing 105 on shaft 91. It also includes a generally channel shaped member 106 rotatably supported through a bearing 107 on a shaft 108 formed integral with spider 98.

The external periphery of ring gear 103 is formed with gear teeth meshing with a pair of pinions 110 each secured to a shaft 111 rotatably supported in bearings 112 in extensions 113 of the housing of planetary gearing 45. Shafts 111 are provided with splined ends 114 disposed in threaded nipples 21, 21'. Splined portions 114 are adapted to be secured to flexible shaftings 12, 12' through coupling members secured to threaded nipples 21, 21'.

Figure 8:
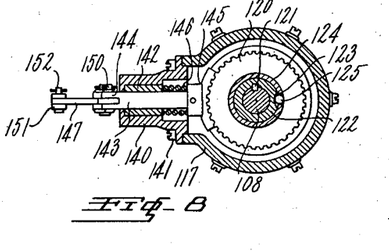
Fig. 8 is a transverse cross-sectional view on the line 8—8 of Fig. 3, looking in the direction of the arrows.

The intermediate portion of shaft 108 is mounted in a bearing 115 supported in a partition 116 secured to the housing 117 of planetary gearing unit 45 through the medium of studs 118. Adjacent bearing 115, a gear 120 is secured to shaft 108 through the medium of a key 121. Gear 120 is operatively associated with brake mechanism 60 in a manner to be described hereinafter, and is formed with a hub portion 122 provided with a depression 123 as shown in Fig. 8. A split sleeve 124 surrounds hub portion 122 and a pin 125 is disposed in depression 123 between the ends of sleeve 124. A bevel gear 126 is mounted on sleeve 124.

The described arrangement acts as a slipping clutch. When torque is applied to shaft 121, this shaft drives gear 120 through key 121 (in the event brake 60 is disengaged). As gear 120 rotates, pin 125 tends to ride out of depression 123 and in so doing engages one of the ends of split sleeve 124 urging the sleeve to expand against bevel gear 126 and drive the same. However, as there is no positive driving connection between shaft 108 and bevel gear 126, these elements may slip with respect to each other in the event of excessive torque on bevel gear 126. The outer reduced end 127 of shaft 108 is mounted in a bearing 128 in an end wall 130 of housing 117.

Bevel gear 126 meshes with a pair of bevel gears 131, 131 each secured to a shaft 132 having a splined outer end 133 disposed in threaded nipples 22, 22'. Shafts 132 are rotatably mounted in bearings 134 in extensions 135 of housing 117. Nipples 22, 22' are secured to extensions 135 through the medium of studs 136. Splined portions 133 are connected to shaftings 12, 12' through the medium of coupling members secured to nipples 22, 22'.

Brake device 60 is more clearly illustrated in Fig. 8. As shown, a housing 140 is secured to housing 117 by studs 141. Housing 140 has therein a bearing 142 engaging a rod 143 having a forked lower end 144. A gear segment 145 is secured to the upper end of rod 143 and is urged into engagement with gear 120 by a spring 146 engaging gear segment 145 and bearing 142.

Referring to Fig. 2, a crank 147 is pivotally mounted in a pair of ears 148 on the lower end of housing 140 and has one arm pivotally connected to the forked end 144 of rod 143 by a pin 150, and the other arm pivotally connected to a fork 151 by pin 152. Fork 151 is adjustably secured to the right hand end of rod 26.

Figure 9:
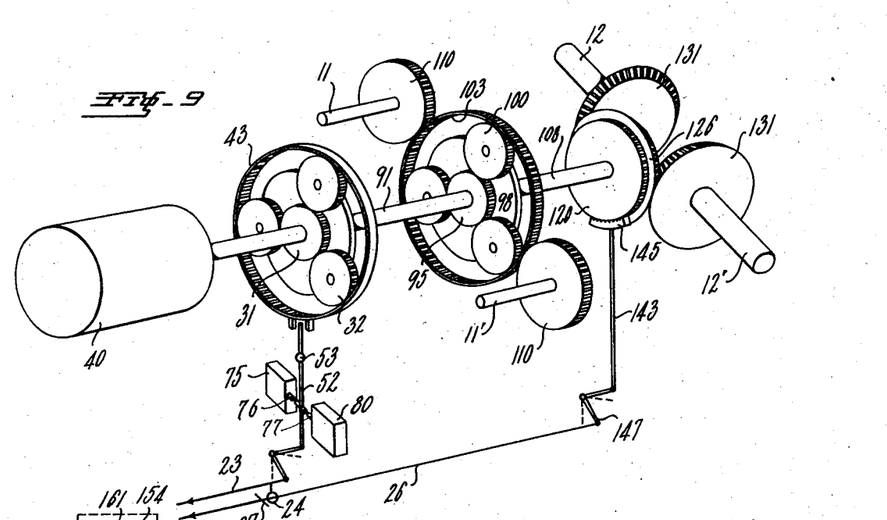
Fig. 9 is a schematic exploded view of the mechanism shown in Fig. 2.

The mechanical operation of mechanism 10 will be apparent by reference to the schematic diagram of Fig. 9. When motor 40 is energized for counter clockwise armature rotation, its pinion 31, through the medium of pinions 32, rotates shaft 91 counterclockwise. As gear segment 145 is engaged with gear 120, spider 98 of planetary gearing unit 45 is locked against rotation. Therefore ring gear 103 of planetary gearing 45 is rotated clockwise through the medium of planetary pinions 100, driving pinions 110, 110 to rotate flexible shafting 11, 11'. This lowers doors 25, 25'.

When the doors are fully opened, they move rod 26 to the left, as viewed in Figs. 2 and 9. Through the medium of crank 147, this moves plunger 143 downwardly disengaging gear segment 145 from gear 120. As the doors are in the fully opened position, gear 103 is prevented from turning further due to the braking effect of pinions 110. Accordingly, spider 98 turns counter clockwise rotating gear 120 and bevel gear 126. This, in turn, rotates bevel gears 131, which, through the medium of flexible shafting 12, 12', operates actuators 30, 30' to retract the landing gear 35, 35'. When the landing gear is fully retracted, the resultant counter torque exerted on ring gear 43 of torque responsive device 50 causes this gear to turn clockwise. This oscillates sleeve member 52 to depress plunger 77 of switch 80.

Operation of switch 80, in a manner described more fully hereinafter, energizes motor 40 for rotation in the reverse direction. This causes drive pinion 31 to be rotated in a clockwise direction, which, through shaft 91, rotates ring gear 103 in a counter clockwise direction. Through the medium of pinions 110 and flexible shafting 11, 11', actuators 20, 20' are operated to move the doors toward a closed position. Immediately after the doors start to move toward a closed position, rod 26 is released and spring 146 of brake unit 60 thereupon urges gear segment 145 into locking engagement with gear 120. When the doors are fully closed, the counter torque exerted on ring gear 43 tends to rotate this gear in a counter clockwise direction. This swings sleeve member 52 in a direction to release plunger 77 and depress plunger 78 of switch 75. This operates switch 75, in a manner to be described, to deenergize motor 40.

Assuming that the landing gear is in the fully retracted position, the lowering of the landing gear takes place in the following manner. Motor 40 is again energized for rotation in the same direction as for retracting the landing gear. As doors 25, 25' are fully closed, gear segment 145 is engaged with gear 120. Accordingly, shaft 91 is again rotated counter clockwise rotating gear 103 clockwise and pinion 110 counter clockwise to open the doors in the manner previously described. When the doors are fully opened, gear segment 145 is released from gear 120 as previously described. Rotation of motor 40 tends to rotate gear 120 counter clockwise, but this is prevented as the landing gear is in the retracted position. Accordingly, a counter torque is developed in ring gear 43 which oscillates clockwise to operate switch 80 reversing the direction of rotating of motor 40. The motor then rotates in a direction to drive gear 120 clockwise and lower the landing gear 35, 35' through flexible shafting 12, 12'. The lowering operation, due to the effect of gravity on the landing gear, takes place with an aiding torque.

When the landing gear has reached the limit of its lower position, spider 98 can move no further. Shaft 91 through pinion 95 thus will rotate gear 103 in a counter clockwise direction and pinions 110 in a clockwise direction to raise doors 25, 25' through flexible shafting 11, 11'. When the doors are fully closed, a counter torque is developed in ring gear 43, which oscillates in a counter clockwise direction to operate switch 75. In a manner to be described, switch 75 breaks the energizing circuit for motor 40 and mechanism 10 comes to a stop.

The gear may also be lowered by gravity. For this purpose, a suitable operating cable is attached to bar 23. When this bar is pulled to the left as viewed in Figs. 2 and 9, plunger 54 is withdrawn into sleeve member 52 against the force of spring 56. It thus disengages ring gear 43. At the same time, flange 24 secured to arm 23 engages collar 27 on rod 26. Rod 26 is thus likewise pulled to the left and through crank 47 releases gear segment 145 from gear 120. Thus, the doors are free to open and the landing gear is free to move to the extended position under the influence of gravity.

Figure 10:
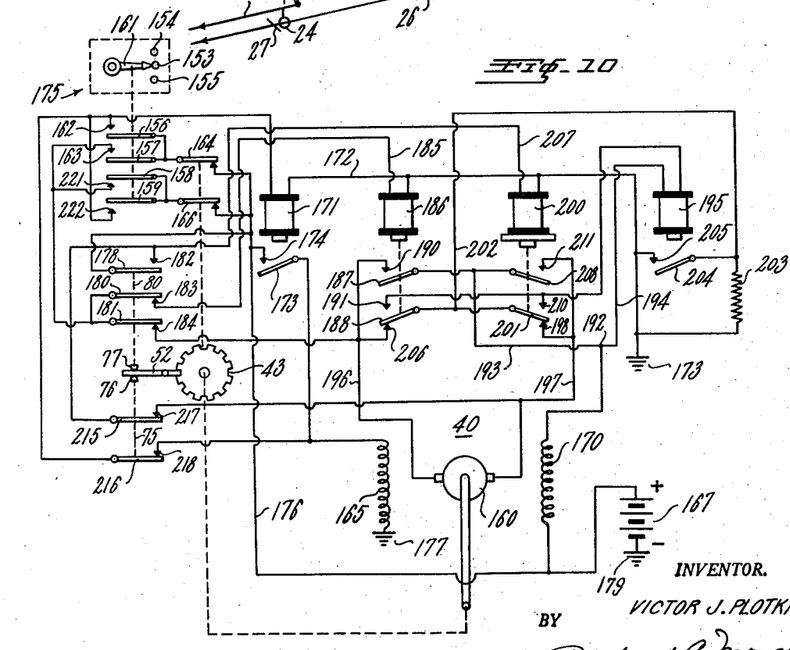
Fig. 10 is a schematic wiring diagram illustrating a control circuit of the invention.

A typical electrical circuit for effecting automatic operation of mechanism 10 is illustrated in Fig. 10. Motor 40 is illustrated as a compound motor having an armature winding 160, a shunt field winding 165 and a series field winding 170. The landing gear is under the control of a selecting switch 175 including an arm 161 movable from a neutral position 153 to either an "up" position 154 or a "down" position 155. Assuming that the landing gear is down, and it is desired to retract the same, arm 161 is moved to "up" position 154. The arm is interconnected with switch blades 156, 157, 158 and 159. Accordingly, switch blades 156 and 157 are engaged respectively with contacts 162 and 163. Switch blades 156, 157 are commonly connected to the positive terminal of a suitable source of current 167 through the medium of "up" limit switch 164. Switch blades 158, 159 are connected to source 167 through "down" limit switch 166. Source 167 may be the usual 28 volt battery or generator carried aboard the aircraft.

As the landing gear is down, limit switch 166 will be open. Engagement of switch 156 with contact 162 connects one terminal of a relay 171 to the positive side of source 167 through "up" limit switch 164 and conductor 176. The other terminal of relay 171 is connected by a conductor 172 to ground 173, which latter is electrically identical with the ground 179 connection to the negative terminal of source 167. Relay 171 engages its armature 173 with its front contact 174. Contact 174 is connected to conductor 176 which is connected to the positive terminal of source 167. Armature 173 is connected to one terminal of shunt field winding 165, the other terminal of which is connected to ground at 177. Accordingly, energization of relay 171 effects energization of shunt field winding 165. Armature 173 also closes a holding circuit for relay 171 through front contact 218 and blade 216 of snap switch 75, so that relay 171 remains energized after limit switch 164 opens when the landing gear is fully retracted.

Engagement of switch 157 with contact 163 connects the positive side of source 167 to switch 80. This switch is illustrated as comprising a three pole, double throw reversing switch including three blades 178, 180, 181. Normally, blade 178 is disengaged from contact 182 and blades 180 and 181 are engaged with contacts 183 and 184 respectively. Blades 180 and 181 are connected to contacts 163 and 221 of switch 175. A conductor 185 connects contact 183 to one terminal of "up" relay 186. The opposite terminal of relay 186 is connected to ground through conductor 172. Energization of relay 186 engages its armatures 187 and 188 with front contacts 190 and 191, respectively. A holding circuit for relay 186 is completed through switches 180 and 181, front contact 190, relay armature 187, conductor 193 and junction point 192. Therefore, relay 186 will remain energized even though "up" limit switch 164 opens when the landing gear has been fully retracted.

Relay 186 controls the energization of motor armature 160 and series field 170 as follows. One terminal of field 170 is connected through conductor 176 to the positive terminal of source 167. The other terminal of the field winding is connected to junction point 192. Conductor 193 connects junction point 192 to armature 187 of relay 186. A conductor 194 connects junction point 192 to one terminal of a relay 195. Accordingly, motor armature 160 and series field winding 170 are energized over the following circuit: positive terminal of source 167, field 170, junction point 192, conductor 193, relay armature 187, front contact 190, conductor 196, motor armature 160, conductor 197, back contact 198 of relay 200, relay armature 201, conductor 202, starting resistance 203 and ground 173. A parallel circuit is also closed through relay 195, which engages its armature 204 with front contact 205 to shunt starting resistance 203.

The doors then open in the manner previously described. When fully open, the doors release gear segment 145 from gear 120, so that continued operation of motor 40 in the same direction will retract the landing gear in the manner set forth above. When the landing gear is fully retracted, "up" limit switch 164 opens, breaking the energizing circuit for relay 171. However, the holding circuit for this relay remains completed through switch 175 and armature 173 of the relay. Shunt field winding 165 thus remains energized.

When the landing gear is fully retracted, the counter torque developed in ring gear 43 swings sleeve member 52 to depress plunger 77 of switch 80. This engages switch blade 178 with contact 182 and disengages switch blades 180, 181 from contacts 183, 184, respectively. The holding circuit for relay 186 is broken, and its armature 188 engages back contact 206. At the same time, an energizing circuit for relay 200 is completed through engagement of switch 178 with contact 182. However, relay 200 is a delayed pick-up relay so that its armature 201 remains in engagement with its back contact 188 for a short interval. A dynamic braking circuit for motor 40 is thus completed through conductor 196, relay contact 206, relay armatures 188 and 201, relay contact 198 and conductor 197. As shunt field winding 165 remains energized, motor armature 160 is quickly brought to a stop.

The energizing circuit for relay 195 is likewise broken by disengagement of relay armature 188 from front contact 191. However, after a predetermined interval, relay 200 engages its armatures 201 and 208 with contacts 210 and 211, respectively. This completes an energizing circuit for motor armature 160 and series field winding 170 for rotation of the motor in the opposite direction. This circuit, as far as conductor 193, is as previously described. From conductor 193, the circuit includes relay armature 208, front contact 211, conductor 197, motor armature 160, conductor 196, contact 206, relay armature 188, conductor 202, starting resistance 203 and ground 173. A holding circuit for relay 200 is completed through switch blade 215 of switch 75, conductor 197, relay contact 211, relay armature 208, and conductor 193 to junction point 192. Relay 200 thus remains energized when switch 75 is restored to the position shown in the drawings. Relay 195 is again energized through having its one terminal connected to ground at contact 210, and closes its armature 204 to shunt resistance 203. Motor 40 then operates in a direction to close doors 25, 25', as previously described.

When the doors reach their closed position, counter torque is again developed in ring gear 43, which swings sleeve member 52 in a direction to disengage plunger 77 and depress plunger 76 of switch 75. This disengages switch blades 215 and 216 from contacts 217 and 218 breaking the holding circuit for relay 171 and relay 200. However, relay 171 remains energized through engagement of switch blade 156 with contact 165 as switch 175 is still in the "up" position. Relay 200 disengages its armatures 201 and 208 from contacts 198 and 211 to complete a shunt circuit for armature 40 through its armature 201 and armature 188 of relay 186. The dynamic braking thus brings motor 40 to a quick stop.

Lowering of the landing gear takes place in essentially the same manner. As the landing gear is up, limit switch 164 is open. Switch 175 is moved to the "down" position engaging switch blades 158, 159 with back contacts 221, 222, respectively. Relay 171 is energized to complete the circuit for shunt field windings 165 through back contact 222 and "down" limit switch 166. Switch blade 180 is connected to the positive terminal of source 167 through switch blade 158, contact 221 and down limit switch 166 which is closed as the landing gear is up. Accordingly, motor 40 is energized as previously described to lower doors 35, 35'. When the doors are fully opened, gear segment 145 is disengaged from gear segment 120. However, the motor is rotating in a direction to effect upward movement of the landing gear. This upward movement is impossible as the landing gear is in its retracted position. Therefore, counter torque developed in gear 143 will swing sleeve member 152 in a direction to reverse switch 80. This first breaks the circuit for relay 186, as previously described, and completes the dynamic braking circuit for motor 40, also as previously described. Relay 200 is energized as previously described to effect operation of motor 40 in the opposite direction. The landing gear therefore is lowered with an aiding torque. When the landing gear has been fully lowered, spider 98 is locked against movement and continued rotation of motor 40 will raise the doors to their upper position. When the doors are fully closed, the counter torque developed in gear 43 operates the switch 75 to break the energizing circuits for motor 40 as previously described, and bring the mechanism to a stop.

It will be noted that switches 75 and 80 also limit the maximum torque of mechanism 10. Any excessive load on the gear drive and the ring gear 43, will tend to rotate ring gear 43 in one direction or the other thus operating one or the other of switches 75 or 80 to either stop motor 40 or reverse the direction of rotation thereof until such time as the torque has dropped below such overload value.

The described invention comprises a compact unit which is operable to effect the operation of two accessories depending upon which accessory requires the least torque to operate the same at any given time. It is particularly adaptable for operating the landing gear and landing gear bay doors of an aircraft. The operation is entirely automatic once the mechanism is conditioned for operation of the landing gear in a particular direction. The torque responsive device 50 also provides overload protection for this system, eliminating the necessity for slipping clutches, extra fuses, or other additional elements.

While a specific embodiment of the invention has been shown and described in detail to illustrate the application of the principles thereof, it will be understood that the invention may be otherwise embodied without departing from such principles.

What is claimed is:

1. A multiple accessory operating mechanism comprising, in combination, a power drive means; planetary gearing including a driving element coupled to said power drive means, a first driven element coupled to a first accessory and a second driven element coupled to a second accessory; brake means normally locking said second driven element against movement whereby, when said power drive means is energized, said driving element, through said first driven element, will operate such first accessory from a first limiting position to a second limiting position; and means operable by such first accessory, when it attains its second limiting position, to release said brake means from said second driven element, whereby said driving element, through said second driven element, will operate such second accessory from a first limiting position to a second limiting position.

2. A multiple accessory operating mechanism comprising, in combination, a power drive means; planetary gearing including a driving element coupled to said power drive means, a first driven element coupled to a first accessory and a second driven element coupled to a second accessory; brake means normally locking said second driven element against movement whereby, when said power drive means is energized, said driving element, through said first driven element, will operate such first accessory from a first limiting position to a second limiting position; means operable by such first accessory, when it attains its second limiting position, to release said brake means from said second driven element, whereby said driving element, through said second driven element, will operate such second accessory from a first limiting position to a second limiting position and a torque responsive device coupled between said power drive means and said planetary gearing and operable, when such second accessory attains its second limiting position, to energize said power drive means in the reverse direction whereby said driving element, through said first driven element, will operate such first accessory from its second limiting position to its first limiting position.

3. A multiple accessory operating mechanism comprising, in combination, a power drive means; planetary gearing including a driving element coupled to said power drive means, a first driven element coupled to a first accessory and a second driven element coupled to a second accessory; brake means normally locking said second driven element against movement whereby, when said power drive means is energized, said driving element, through said first driven element, will operate such first accessory from a first limiting position to a second limiting position; means operable by such first accessory, when it attains its second limiting position, to release said brake means from said second driven element, whereby said driving element, through said second driven element, will operate such second accessory from a first limiting position to a second limiting position; and a torque responsive device coupled between said power drive means and said planetary gearing and operable, when such second accessory attains its second limiting position, to energize said power drive means in the reverse direction whereby said driving element, through said first driven element, will operate such first accessory from its second limiting position to its first limiting position; said device being operative, when such first accessory attains its first limiting position, to deenergize said power drive means.

4. A multiple accessory operating mechanism comprising, in combination, a power drive means; planetary gearing including a driving element coupled to said power drive means, a first driven element coupled to a first accessory and a second driven element coupled to a second accessory; brake means normally locking said second driven element against movement whereby, when said power drive means is energized, said driving element, through said first driven element, will operate such first accessory from a first limiting position to a second limiting position; means operable by such first accessory, when it attains its second limiting position, to release said brake means from said second driven element, whereby said driving element, through said second driven element, will operate such second accessory from a first limiting position to a second limiting position; and manually operable means operatively associated with said gearing and effective, when operated, to uncouple said power drive means from said planetary gearing and to release said brake means to provide for movement of such accessories under the influence of gravity.

5. A multiple accessory operating mechanism comprising, in combination, a power drive means; planetary gearing including a driving element coupled to said power drive means, a first driven element coupled to a first accessory and a second driven element coupled to a second accessory; brake means normally locking said second driven element against movement whereby, when said power drive means is energized, said driving element, through said first driven element, will operate such first accessory from a first limiting position to a second limiting position; means operable by such first accessory, when it attains its second limiting position, to release said brake means from said second driven element, whereby said driving element, through said second driven element, will operate such second accessory from a first limiting position to a second limiting position; and a speed governor effective to limit the rate of operation of such accessories.

6. A multiple accessory operating mechanism comprising, in combination, an electric motor; planetary gearing including a driving element coupled to said electric motor, a first driven element coupled to a first accessory and a second driven element coupled to a second accessory; brake means normally locking said second driven element against movement whereby when said electric motor is energized, said driving element, through said first driven element, will operate such first accessory from a first limiting position to a second limiting position; and means operable by such first accessory, when it attains its second limiting position, to release said brake means from said second driven element, whereby said driving element, through said second driven element, will operate such second accessory from a first limiting position to a second limiting position.

7. A multiple accessory operating mechanism comprising, in combination, a reversible electric motor; planetary gearing including a driving element coupled to said electric motor, a first driven element coupled to a first accessory and a second driven element coupled to a second accessory; brake means normally locking said second driven element against movement whereby when said electric motor is energized, said driving element, through said first driven element, will operate such first accessory from a first limiting position to a second limiting position; means operable by such first accessory, when it attains its second limiting position, to release said brake means from said second driven element, whereby said driving element, through said second driven element, will operate such second accessory from a first limiting position to a second limiting position; and a torque responsive device coupled between said electric motor and said planetary gearing and operable, when such second accessory attains its second limiting position, to energize said electric motor in the reverse direction whereby said driving element, through said first driven element, will operate such first accessory from its second limiting position to its first limiting position.

8. A multiple accessory operating mechanism comprising, in combination, a reversible electric motor; planetary gearing including a driving element coupled to said electric motor, a first driven element coupled to a first accessory and a second driven element coupled to a second accessory; brake means normally locking said second driven element against movement whereby when said electric motor is energized, said driving element, through said first driven element, will operate such first accessory from a first limiting position to a second limiting position; means operable by such first accessory, when it attains its second limiting position, to release said brake means from said second driven element, whereby said driving element, through said second driven element, will operate such second accessory from a first limiting position to a second limiting position; and a torque responsive device coupled between said electric motor and said planetary gearing and operable, when such second accessory attains its second limiting position, to energize said electric motor in the reverse direction whereby said driving element, through said first driven element, will operate such first accessory from its second limiting position to its first limiting position; said device being operative, when such first accessory attains its first limiting position, to deenergize said electric motor.

9. A multiple accessory operating mechanism comprising, in combination, an electric motor; planetary gearing including a driving element coupled to said electric motor, a first driven element coupled to a first accessory and a second driven element coupled to a second accessory; brake means normally locking said second driven element against movement whereby when said electric motor is energized, said driving element, through said first driven element, will operate such first accessory from a first limiting position to a second limiting position; means operable by such first accessory, when it attains its second limiting position, to release said brake means from said second driven element, whereby said driving element, through said second driven element, will operate such second accessory from a first limiting position to a second limiting position; and manually operable means operatively associated with said gearing and effective, when operated, to uncouple said motor from said planetary gearing and to release said brake means to provide for movement of such accessories under the influence of gravity.

10. A multiple accessory operating mechanism comprising, in combination, an electric motor; planetary gearing including a driving element coupled to said electric motor, a first driven element coupled to a first accessory and a second driven element coupled to a second accessory; brake means normally locking said second driven element against movement whereby when said electric motor is energized, said driving element, through said first driven element, will operate such first accessory from a first limiting position to a second limiting position; means operable by such first accessory, when it attains its second limiting position, to release said brake means from said second driven element, whereby said driving element, through said second driven element, will operate such second accessory from a first limiting position to a second limiting position; and a speed governor effective to limit the rate of operation of such accessories.

11. A multiple accessory operating mechanism comprising, in combination, an electric motor; planetary gearing including a driving element coupled to said electric motor, a first driven element coupled to a first accessory and a second driven element coupled to a second accessory; brake means normally locking said second driven element against movement whereby when said electric motor is energized, said driving element, through said first driven element, will operate such first accessory from a first limiting position to a second limiting position; means operable by such first accessory, when it attains its second limiting position, to release said brake means from said second driven element, whereby said driving element, through said second driven element, will operate such second accessory from a first limiting position to a second limiting position; manually operable means operatively associated with said gearing and effective, when operated, to uncouple said motor from said planetary gearing and to release said brake means to provide for movement of such accessories under the influence of gravity; and a speed governor effective to limit the rate of operation of such accessories.

12. A multiple accessory operating mechanism comprising, in combination, an electric motor; reduction gearing, including a normally stationary movable member, coupled to said motor; a pivotally mounted retractable element normally engaged with said movable member; switch means operable by said retractable element to control the energization of said motor; adjustable means restraining movement of said retractable element and said movable member; planetary gearing including a driving element coupled to said reduction gearing, a first driven element coupled to a first accessory and a second driven element coupled to a second accessory; brake means normally locking said second driven element against movement whereby when said electric motor is energized, said driving element, through said first driven element, will operate such first accessory from a first limiting position to a second limiting position; and means operable by such first accessory, when it attains its second limiting position, to release said brake means from said second driven element whereby said driving element, through said second driven element, will operate such second accessory from a first limiting position to a second limiting position; said movable member, when such second accessory attains its second limiting position, moving in response to the counter torque thereupon to swing said retractable element to selectively operate said switch means to energize said electric motor in the reverse direction whereby said driving element, through said first driven element, will operate such first accessory from its second limiting position to its first limiting position.

13. A multiple accessory operating mechanism comprising, in combination, an electric motor; reduction gearing, including a normally stationary movable member, coupled to said motor; a pivotally mounted retractable element normally engaged with said movable member; switch means operable by said retractable element to control the energization of said motor; adjustable means restraining movement of said retractable element and said movable member; planetary gearing including a driving element coupled to said reduction gearing, a first driven element coupled to a first accessory and a second driven element coupled to a second accessory; brake means normally locking said second driven element against movement whereby when said electric motor is energized, said driving element, through said first driven element, will operate such first accessory from a first limiting position to a second limiting position; means operable by such first accessory, when it attains its second limiting position, to release said brake means from said second driven element, whereby said driving element, through said second driven element, will operate such second accessory from a first limiting position to a second limiting position; said movable member, when such second accessory attains its second limiting position, moving in response to the counter torque thereupon to swing said retractable element to selectively operate said switch means to energize said electric motor in the reverse direction whereby said driving element, through said first driven element, will operate such first accessory from its second limiting position to its first limiting position; and said movable member, when such first accessory attains its first limiting position, moving in response to the counter torque thereupon to swing said retractable element to selectively operate said switch means to deenergize said motor.

14. A multiple accessory operating mechanism comprising, in combination, an electric motor; reduction gearing, including a normally stationary movable member, coupled to said motor; a pivotally mounted retractable element normally engaged with said movable member; switch means operable by said retractable element to control the energization of said motor; adjustable means retraining movement of said retractable element and said movable member; planetary gearing including a driving element coupled to said reduction gearing, a first driven element coupled to a first accessory and a second driven element coupled to a second accessory; brake means normally locking said second driven element against movement whereby when said electric motor is energized, said driving element, through said first driven element, will operate such first accessory from a first limiting position to a second limiting position; brake release means operable by such first accessory, when it attains its second limiting position, to release said brake means from said second driven element, whereby said driving element, through said second driven element, will operate such second accessory from a first limiting position to a second limiting position; said movable member, when such second accessory attains its second limiting position, moving in response to the counter torque thereupon to swing said retractable element to selectively operate said switch means to energize said electric motor in the reverse direction whereby said driving element, through said first driven element, will operate such first accessory from its second limiting position to its first limiting position; said movable member, when such first accessory attains its first limiting position, moving in response to the counter torque thereupon to swing said retractable element to selectively operate said switch means to deenergize said motor; and manual means coupled to said retractable element and to said brake release means and effective, when operated, to withdraw said retractable element from engagement with said movable member and to release said brake to operatively uncouple said motor from said planetary gearing to provide for movement of such accessories under the influence of gravity.

15. A multiple accessory operating mechanism comprising, in combination, an electric motor; reduction gearing, including a normally stationary movable member, coupled to said motor; a pivotally mounted retractable element normally engaged with said movable member; switch means operable by said retractable element to control the energization of said motor; adjustable means retraining movement of said retractable element and said movable member; planetary gearing including a driving element coupled to said reduction gearing, a first driven element coupled to a first accessory and a second driven element coupled to a second accessory; brake means normally locking said second driven element against movement whereby when said electric motor is energized, said driving element, through said first driven element, will operate such first accessory from a first limiting position to a second limiting position; brake release means operable by such first accessory, when it attains its second limiting position, to release said brake means from said second driven element, whereby said driving element, through said second driven element, will operate such second accessory from a first limiting position to a second limiting position; said movable member, when such second accessory attains its second limiting position, moving in response to the counter torque thereupon to swing said retractable element to selectively operate said switch means to energize said electric motor in the reverse direction whereby said driving element, through said first driven element, will operate such first accessory from its second limiting position to its first limiting position; said movable member, when such first accessory attains its first limiting position, moving in response to the counter torque thereupon to swing said retractable element to selectively operate said switch means to deenergize said motor; a centrifugal governor coupled between said reduction gearing and said planetary gearing and effective to limit the rate of operation of such accessories; and manual means coupled to said retractable element and to said brake release means and effective, when operated, to withdraw said retractable element from engagement with said movable member and to release said brake to operatively uncouple said motor from said planetary gearing to provide for movement of such accessories under the influence of gravity.

16. An aircraft landing gear and landing gear bay door operating mechanism comprising, in combination, an electric motor; first actuator means operable to move the doors between open and closed positions; second actuator means operable to move the landing gear between extended and retracted positions; planetary gearing including a driving element coupled to said motor, a first driven element coupled to said first actuator means and a second driven element coupled to said second actuator means; brake means normally locking said second driven element against movement whereby when said motor is energized, said driving element, through said first driven element, will operate said first actuator means to open such doors; and release means coupling said brake means to the doors to release said brake means when the doors are fully open whereby said driving element, through said second driven element, will operate said second actuator means to retract said landing gear.

17. An aircraft landing gear and landing gear bay door operating mechanism comprising, in combination, an electric motor; first actuator means operable to move the doors between open and closed positions; second actuator means operable to move the landing gear between extended and retracted positions; planetary gearing including a driving element coupled to said motor, a first driven element coupled to said first actuator means and a second driven element coupled to said second actuator means; brake means normally locking said second driven element against movement whereby when said motor is energized, said driving element, through said first driven element, will operate said first actuator means to open such doors; release means coupling said brake means to the doors to release said brake means when the doors are fully open whereby said driving element, through said second driven element, will operate said second actuator means to retract said landing gear; a torque responsive device coupled between said motor and said driven element; and switch means selectively operable by said device, when the torque thereon exceeds a predetermined value, to deenergize or reverse the direction of rotation of said motor; said torque responsive device, when such landing gear is fully retracted, operating said switch means to reverse said motor whereby said driving element, through said first driven element, will operate said first actuator means to close such doors; said device, when the doors are fully closed, operating said switch means to deenergize said motor; said torque responsive device, when said motor is energized with the landing gear in the retracted position and the doors have fully opened, operating said switch means to reverse the direction of rotation of said motor whereby said driving element, through said second driven element, will operate said second actuator means to extend the landing gear and said device, when the landing gear is fully extended, operating said switch means to again reverse the direction of rotation of said motor whereby said planetary gearing will operate said first actuator means to close said doors; said device, when the doors are again fully closed, operating said switch means to deenergize said motor.

18. An aircraft landing gear and landing gear bay door operating mechanism comprising, in combination, an electric motor; first actuator means operable to move the doors between open and closed positions; second actuator means operable to move the landing gear between extended and retracted positions; planetary gearing including a driving element coupled to said motor, a first driven element coupled to said first actuator means and a second driven element coupled to said second actuator means; brake means normally locking said second driven element against movement whereby when said motor is energized, said driving element, through said first driven element, will operate said first actuator means to open such doors; release means coupling said brake means to the doors to release said brake means when the doors are fully open whereby said driving element, through said second driven element, will operate said second actuator means to retract said landing gear; a torque responsive device coupled between said motor and said driven element; switch means selectively operable by said device, when the torque thereon exceeds a predetermined value, to deenergize or reverse the direction of rotation of said motor; said torque responsive device, when such landing gear is fully retracted, operating said switch means to reverse said motor whereby said driving element, through said first driven element, will operate said first actuator means to close such doors; said device, when the doors are fully closed, operating said switch means to deenergize said motor; said torque responsive device, when said motor is energized with the landing gear in the retracted position and the doors have fully opened, operating said switch means to reverse the direction of rotation of said motor whereby said driving element, through said second driven element, will operate said second actuator means to extend the landing gear and said device, when the landing gear is fully extended, operating said switch means to again reverse the direction of rotation of said motor whereby said planetary gearing will operate said first actuator means to close said doors; said device, when the doors are again fully closed, operating said switch means to deenergize said motor; manually operable means operatively associated with said device and effective, when operated, to uncouple said motor from said planetary gearing and to release said brake means to provide for movement of the landing gear and doors under the influence of gravity; and a centrifugal governor coupled between said motor and said planetary gearing and effective to limit the rate of operation of the landing gear and doors.

19. An aircraft landing gear and landing gear bay door operating mechanism comprising, in combination, an electric motor; first actuator means operable to move the doors between open and closed positions; second actuator means operable to move the landing gear between extended and retracted positions; planetary gearing including a driving element coupled to said motor, a first driven element coupled to said first actuator means and a second driven element coupled to said second actuator means; brake means normally locking said second driven element against movement whereby when said motor is energized, said driving element, through said first driven element, will operate said first actuator means to open such doors; release means coupling said brake means to the doors to release said brake means when the doors are fully open whereby said driving element, through said second driven element, will operate said second actuator means to retract said landing gear; a torque responsive device coupled between said motor and said driven element; switch means selectively operable by said device, when the torque thereon exceeds a predetermined value, to deenergize or reverse the direction of rotation of said motor; said torque responsive device, when such landing gear is fully retracted, operating said switch means to reverse said motor whereby said driving element, through said first driven element, will operate said first actuator means to close such doors; said device, when the doors are fully closed, operating said switch means to deenergize said motor; said torque responsive device, when said motor is energized with the landing gear in the retracted position and the doors have fully opened, operating said switch means to reverse the direction of rotation of said motor whereby said driving element, through said second driven element, will operate said second actuator means to extend the landing gear and, said device, when the landing gear is fully extended, operating said switch means to again reverse the direction of rotation of said motor whereby said planetary gearing will operate said first actuator means to close said doors; said device, when the doors are again fully closed, operating said switch means to deenergize said motor; manually operable means operatively associated with said device and effective, when operated, to uncouple said motor from said planetary gearing and to release said brake means to provide for movement the landing gear and doors under the influence of gravity; a centrifugal governor coupled between said motor and said planetary gearing and effective to limit the rate of operation of the landing gear and doors; and a control circuit for said motor including said switch means and conditioned, upon deenergization of said motor, to effect dynamic braking thereof.

20. A torque limiting mechanism for a motor drive system comprising, in combination, a gear unit including a driving element adapted to be coupled to the motor, a driven element, and a normally stationary movable element effective to transmit torque from said driving element to said driven element; a sleeve pivotally mounted in said unit; motor controlling switch means operably by pivotal movement of said sleeve; adjustable means restraining pivotal movement of said sleeve; a plunger slidably mounted in said sleeve; means normally urging said plunger to engage said movable element to prevent oscillation thereof; said movable element, when the torque on said mechanism exceeds a predetermined amount, oscillating to pivot said sleeve and operate said switch means to alter the energization of said motor; and manually operable means selectively operable to disengage said plunger from said movable element to operatively uncouple the motor from said driven element.

VICTOR J. PLOTKIN.